(12) United States Patent
Antonini

(10) Patent No.: US 10,864,390 B2
(45) Date of Patent: Dec. 15, 2020

(54) OXYGEN MASK

(71) Applicant: B/E Aerospace Systems GmbH, Lübeck (DE)

(72) Inventor: Marco Silvi Antonini, Krummesse (DE)

(73) Assignee: B/E Aerospace Systems GMBH, Lübeck (DE)

( * ) Notice: Subject to any disclaimer, the term of this patent is extended or adjusted under 35 U.S.C. 154(b) by 670 days.

(21) Appl. No.: 14/994,107

(22) Filed: Jan. 12, 2016

(65) Prior Publication Data

US 2016/0213956 A1    Jul. 28, 2016

(30) Foreign Application Priority Data

Jan. 23, 2015    (DE) .................. 10 2015 201 124

(51) Int. Cl.
| | | |
|---|---|---|
| *A62B 18/02* | (2006.01) | |
| *A62B 7/14* | (2006.01) | |
| *A62B 9/04* | (2006.01) | |
| *A62B 18/10* | (2006.01) | |
| *A62B 25/00* | (2006.01) | |
| *A62B 18/08* | (2006.01) | |
| *B64D 11/00* | (2006.01) | |

(52) U.S. Cl.
CPC .............. *A62B 18/02* (2013.01); *A62B 7/14* (2013.01); *A62B 9/04* (2013.01); *A62B 18/084* (2013.01); *A62B 18/10* (2013.01); *A62B 25/005* (2013.01); *B64D 11/00* (2013.01); *B64D 2231/025* (2013.01)

(58) Field of Classification Search
CPC ........ A61M 16/00; A61M 16/06–0694; A61M 16/20–209; A61M 16/003–0012; A61M 2016/0015–0042; A62B 9/00; A62B 9/02–027; A62B 7/00; A62B 7/14; A62B 18/00–088; B63C 11/12; B63C 11/18

See application file for complete search history.

(56) References Cited

U.S. PATENT DOCUMENTS 2,655,150 A * 10/1953 Cupp ..................... A62B 18/00
                                                            128/205.13
3,542,522 A    11/1970 Mausteller
(Continued)

FOREIGN PATENT DOCUMENTS

| CN | 1292652 A | 4/2001 |
|---|---|---|
| CN | 101107165 A | 1/2008 |

(Continued)

OTHER PUBLICATIONS

Examination Report for German Application No. 102015200062.1, dated Jul. 15, 2015, 1 page.

(Continued)

*Primary Examiner* — Samchuan C Yao
*Assistant Examiner* — Ned T Heffner
(74) *Attorney, Agent, or Firm* — Locke Lord LLP

(57) ABSTRACT

The invention relates to an oxygen mask (1) for an emergency oxygen supply of passengers in an aircraft, with a carrier (12), on which a breathing bag connection (5) for a breathing bag (11), an inhalation valve (3) and an exhalation valve (4) are provided, wherein the carrier (12) comprises at least two carrier parts (14, 15, 16) which are arranged pivotable to one another.

10 Claims, 2 Drawing Sheets

(56) References Cited

U.S. PATENT DOCUMENTS

| | | | |
|---|---|---|---|
| 4,623,520 A | 11/1986 | Robinet | |
| 4,625,721 A * | 12/1986 | Levine | A62B 7/14 |
| | | | 128/201.28 |
| 4,891,189 A | 1/1990 | Harwood, Jr. | |
| 5,772,976 A | 6/1998 | Cortellucci et al. | |
| 7,494,624 B2 | 2/2009 | Crudace et al. | |
| 2004/0151639 A1 | 8/2004 | Jones et al. | |
| 2007/0240720 A1 * | 10/2007 | Castro | A62B 18/00 |
| | | | 128/206.12 |
| 2009/0217926 A1 * | 9/2009 | Hine | A62B 18/02 |
| | | | 128/201.25 |

FOREIGN PATENT DOCUMENTS

| | | |
|---|---|---|
| CN | 103153379 A | 6/2013 |
| GB | 2345860 A | 7/2000 |
| WO | WO02/098512 A1 | 12/2002 |
| WO | WO04/024239 A1 | 3/2004 |
| WO | 2015117282 A1 | 8/2015 |

OTHER PUBLICATIONS

Examination Report for German Application No. 102015201124.0, dated Nov. 21, 2015, 2 pages.
Notice of Allowance for U.S. Appl. No. 14/978,326, dated Jul. 5, 2017, 21 pages.
Search Report dated Nov. 16, 2016 for FR1650478.
First Office Action on Chinese Application No. 2016100445875 dated Aug. 22, 2019. 9 pages.

\* cited by examiner

OXYGEN MASK

CROSS-REFERENCES TO RELATED APPLICATIONS

This application claims priority from German Patent Application No. 10 2015 201 124.0, filed Jan. 23, 2015 incorporated by reference in its entirety.

BACKGROUND

The invention relates to an oxygen mask for the emergency oxygen supply of passengers in an aircraft, with a carrier (12), on which a breathing bag connection (5) for a breathing bag (1), an inhalation valve (3) and an exhalation valve (4) are provided.

Oxygen masks are usually provided in the cabin ceiling above each seat, for the oxygen supply to passengers of an aircraft, for example with a sudden pressure loss in the cabin, and these oxygen masks in the case of emergency drop out of the cabin ceiling, and supply the passengers with oxygen either from a central supply via oxygen bottles or from a chemical gas generator.

Oxygen masks for passenger aircrafts which are known from the state of the art, for example of the type Oxygen Mask of B/E Aerospace Systems GmbH, Lübeck, are generally constructed as follows: A flexible mask body of silicone is injected onto a solid valve plate which is mostly designed in a round manner, is manufactured of plastic and on which an inhalation valve and an exhalation valve as well as a breathing bag connection are provided, and this mask body forms the direct connection to the human face and accordingly seals it, on use of the oxygen mask. A breathing bag, a flow-indicator and a flexible tube (hose) are moreover located on the oxygen mask and these are packed into the mask body on packing the mask.

The disadvantage of these known oxygen masks however is the fact that they are still relatively voluminous even after the packing procedure described above, in which all components are accommodated in the interior of the mask which is delimited by the mask body. However, as is known, it is indeed in passenger aircrafts that the stowage space is very limited, so that oxygen masks which can be packed to an even smaller extent are desirable.

SUMMARY OF THE INVENTION

It is therefore one object of the present invention, to provide an oxygen mask which in particular, taking account of the SAE standard AS8025 for the minimal demands regarding the fashioning, design and performance of oxygen masks for aircraft passengers in civil aviation, demands particularly little stowage space in the packed condition.

This object is achieved by an oxygen mask with the features according to claim 1. Advantageous further developments of the oxygen mask according to the invention are defined in the dependent claims. Thereby, the features specified in the dependent claims and the description, in each case per se but also in a suitable combination can further form the solution according to the invention and according to claim 1.

According to the invention, accordingly an oxygen mask for the emergency oxygen supply of passengers in an aircraft, with a carrier, on which a breathing bag connection for a breathing bag, an inhalation valve and an exhalation vale are provided, is made available, wherein the carrier comprises at least two carrier parts which are arranged pivotable to one another. The oxygen mask can be brought into a significantly smaller construction size and thus into a very small package/packing volume by way of the provision of at least two carrier parts which are arranged pivotable to one another and by way of their ability to be folded together, which is rendered possible by way of this, so that the oxygen mask requires a smaller stowage (storage) space requirement or space requirement in the oxygen mask container of an aircraft.

According to a preferred embodiment of the invention, the carrier parts are connected to one another by way of at least one hinge which is designed as a film hinge between plate sections of the carrier. The use of a hinge is particularly favourable with regard to the manufacture of the oxygen mask and its production costs, if the carrier and the plate sections are manufactured of plastic. The carrier and the plate sections hereby can be manufactured together with the respective hinges as one piece.

The carrier preferably comprises a carrier plate. The carrier plate can moreover comprise a central plate section, on which the breathing bag connection is provided.

According to a further preferred embodiment, a first plate section and a second plate section extend laterally from the central plate section. This arrangement has the advantage that the plate sections are arranged and can be folded to both parts of the central plate section, by which means a particularly compact construction shape is achieved.

The plate sections are essentially intrinsically stable, similar to the valve plate known from the state of the art.

The inhalation valve can thereby advantageously be arranged on the first plate section and the exhalation valve on the second plate section. A reverse arrangement can also be realised, i.e. an arrangement of the exhalation valve on the first plate section and of the inhalation valve on the second plate section. Thereby, the inhalation valve, the exhalation valve and the breathing bag connection can have a geometry, as is used with the oxygen masks which are known from the state of the art. This in particular means that known sizes and construction shapes can be retained for the individual valves of the oxygen mask, which in turn is advantageous with regard to the production costs.

It is particularly advantageous if the carrier has an essentially elongate shape and the breathing bag connection is arranged between the inhalation valve and the exhalation valve.

Moreover, it is preferable if the first plate section is connected to the central plate section via at least one first film hinge. Particularly advantageously, two or more film hinges are provided between the first plate section and the central plate section, which for example can be arranged next to one another, in order to improve the foldability of the plate sections.

The second plate section can also be connected to the central plate section via at least one second film hinge. Hereby, it is likewise particularly preferable if here too, two or more film hinges are provided in a manner arranged next to one another, in order to improve the foldability of the plate section.

A peripheral flexible mask body can moreover be injected on the carrier plate, and this mask body has a smaller wall thickness in the region adjacent to the first film hinge and in the region adjacent to the second film hinge, than in the regions lying therebetween. On folding in the oxygen mask or folding it together, the mask body can be brought better into the packed forced condition by way of this configuration, and this simplifies the packing procedure of the oxygen mask.

Finally, the oxygen mask preferably comprises an elastic band, i.e. rubber band for fixing the oxygen mask on the head of a user, wherein a first end of the band engages on the first plate section and a second end of the band engages on the second plate section. The adaptation of the individual plate sections to the head shape is advantageously effected in an almost automatic manner by way of this.

BRIEF DESCRIPTION OF THE DRAWINGS

The invention is hereinafter explained in more detail by way of an embodiment example represented in the drawing. There are shown in.

DETAILED DESCRIPTION OF THE PREFERRED EMBODIMENTS

Figure 1:
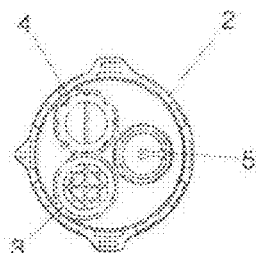
FIG. 1 is a front view of a valve plate of an oxygen mask according to the state of the art.

FIG. 1 is a front view of a valve plate 2 of an oxygen mask 1 (see FIG. 2) which can be applied for passengers of an aircraft, according to the state of the art. The valve plate 2 which is known from the state of the art is designed essentially as a round disc. An inhalation valve 3, an exhalation valve 4 and a breathing bag connection 5 are moreover provided in the valve plate 2. The valve plate 2 is rigid and is manufactured of plastic, for example of a thermoplastic plastic.

Figure 2:
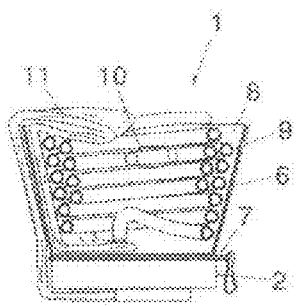
FIG. 2 is a sectioned view through an oxygen mask according to the state of the art.

FIG. 2 is a sectioned view through an oxygen mask 1 according to the state of the art. With the oxygen mask 1 which is represented here, a fixed, i.e. non-flexible plastic valve plate 2 as is represented in FIG. 1 and has been explained in this context was connected to a flexible mask body 6 of silicone. The mask body 6 is injected onto the lower side 7 of the valve plate 2 and projects upwards in a funnel-like manner from the lower side 7. On use of the oxygen mask 1, the mask body 6 forms the direct connection to the face of the user, since it is applied onto the face around the nose and mouth. It forms the sealing of the mask 1 to the face. In the packed condition, as is shown here, in which it is stowed away in an oxygen mask container in an aircraft, further components of the oxygen mask 1 such as a flexible tube 9 with a flow display 10 and a breathing bag 11 in this case, are arranged in an inner region 8 surrounded by the mask body 6. As a whole the thus packed oxygen mask 1 represents a relatively voluminous arrangement due to the relatively large base surface of the valve plate 2, on which the three valves required for the oxygen supply are arranged, and due to the mask body 6 projecting away therefrom in a funnel-like manner.

Figure 3A:
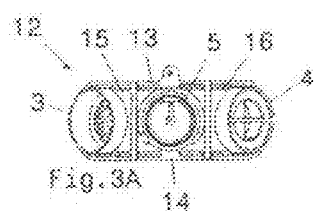
FIGS. 3A, 3B are respective views of a carrier plate of an oxygen mask according to one embodiment of the invention, in the folded-out condition.
Figure 3B:
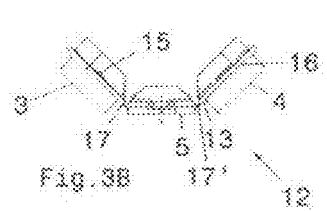

FIGS. 3A and 3B in each case are respective views of a carrier 12 of an oxygen mask 1 according to one embodiment of the invention, in a folded out condition, whereby FIG. 3A is a view of the carrier 12 from the front and FIG. 3B is a plan view of the carrier 12. As can be recognized in FIG. 3A, the oxygen mask 1 likewise comprises an inhalation valve 3, an exhalation valve 4 and a breathing bag connection 5. In contrast to the embodiment represented in FIGS. 1 and 2, these however are not provided together on a round base plate, but in contrast, are provided next to one another. The carrier 12 for this is designed as a carrier plate 13 which is subdivided into three sections: a central plate section 14, on which the breathing bag connection 5 is provided, a first plate section 15 which connects laterally thereon (here to the left side) and on which the inhalation valve 3 is provided, and a second plate section 16 which connects laterally on the other side (here to the right side) onto the central plate section 14 and on which the exhalation valve 4 is provided. The carrier 12 thus as a whole has an elongate shape.

The first plate section 15 and the second plate section 16 are pivotable in a direction to one another, relative to the central plate section 14 arranged centrally therebetween, in order to be able to bring the oxygen mask 1 into a smaller size, in particular in the packed condition. The pivotability in the embodiment which is represented here is realized by the provision of film hinges 17, 17'. Thus here the first plate section 15 and the central plate section 14 are connected to one another via a first film hinge 17, and the second plate section 16 and the central plate section 14 are connected to one another via a second film hinge 17' in each case, so that the first and the second plate section 16, 17 can be folded in. Two film hinges or several hinges over the hinge length and which are arranged along the hinge axis at a distance to one another or next to one another can also be provided instead of a continuous hinge 17 and 17'.

Figure 4:
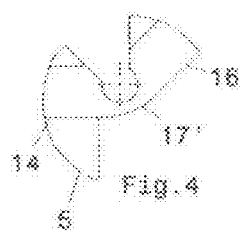
FIG. 4 is a detailed view of a joint connection of the carrier plate shown in FIG. 3B.

FIG. 4 is a detailed view of a joint connection of the carrier plate 13 shown in FIG. 3B, in particular of the connection of the central plate section 14 to the second plate connection 16 via the second film hinge 17'. A limited pivot movement of the connected plate sections 14, 16 is made possible due to the connection region which is significantly more thinly walled in comparison to the material thickness of the central plate section 14 and of the second plate section 16.

Figure 5A:
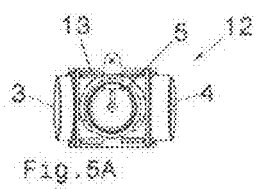
FIGS. 5A, 5B are respective views of the carrier shown in FIGS. 3A and 3B, in the folded-together condition.
Figure 5B:
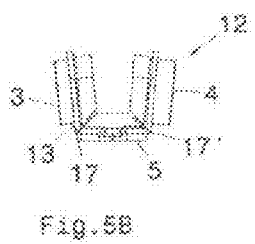

FIG. 5A and FIG. 5B in each case are views of the carrier 12 shown in FIGS. 3A and 3B, in the folded together condition, wherein FIG. 5A is a view of the carrier 12 from the front and FIG. 5B is a plan view of the carrier 12. As can be recognized here, the size of the carrier 12 can be significantly reduced by way of pivoting for folding together the first and the second plate sections 15, 16.

Figure 6A:
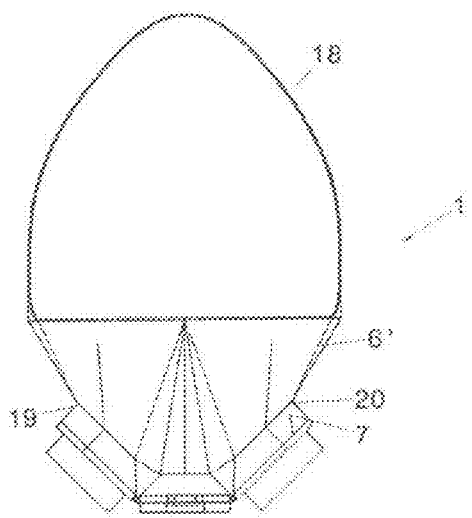
FIGS. 6A, 6B, 6C are respective views of an oxygen mask according to one embodiment of the invention.
Figure 6B:
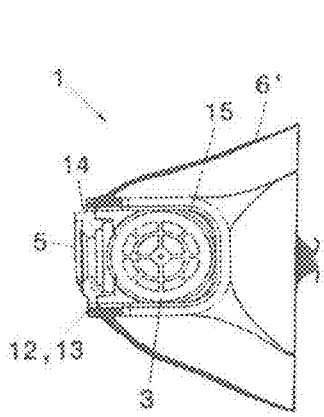
Figure 6C:
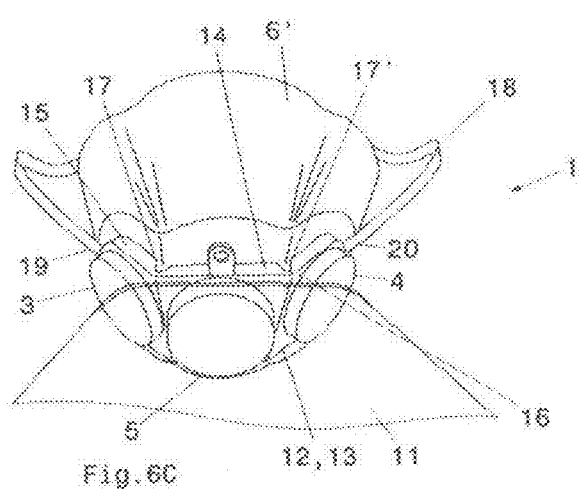

FIG. 6A, FIG. 6B and FIG. 6C are respective views of an oxygen mask 1 according to one embodiment of the invention, with which the carrier plate 13 explained in the context of FIGS. 3A to 5B is applied. FIG. 6A represents a plan view of the oxygen mask 1, FIG. 6B a lateral view of the oxygen mask 1 and FIG. 6C a view obliquely from above. With the oxygen mask 1 which is shown here, a peripheral flexible mask body 6' of silicone is injected onto the lower side 7 of the carrier plate 13, and this mask body in the manufacturing process is injected onto the carrier plate 15, 16 in the opened condition, i.e. with first and second carrier sections 15, 16 which are folded out. The mask body 6' can also consist of another suitable plastic. In order, when folding in the first and the second carrier sections 15, 16, to prevent material accumulation of the mask body 6' arising on the tapering walls, the mask 6' in this region has a reduced wall thickness and can thus be brought better into the packed condition. On packing the oxygen mask 1, the mask body 6' is firstly folded inwards before folding in the first and second plate sections 15, 16, and this is simplified on account of the reduced wall thickness. The breathing bag 11 which is connected to the breathing bag connection 5 and is recognizable in FIG. 6C is then laid such that the breathing bag 11 wraps around the first and the second plate sections 15 and 16 and thus the inhalation and exhalation valves 3 and 4 arranged thereon, as well as the mask body 6' and holds the thus packed oxygen mask together. Finally, one can recognize from FIGS. 6A to 6C, that the oxygen mask 1 comprises a rubber band 18. The rubber band 18 serves for the fixation of the oxygen mask 1 on the head of a user, wherein a first end 19 of the rubber band 18 engages on the first plate section 15, and a second end 20 of the rubber band 18 engages on the second plate section 16. The adaptation of the individual plate sections 14, 15 16 to the shape of the head and their pivoting to one another is accomplished in an almost automatic manner by way of this.

Just for comparison, it is to be noted that the carrier plate 2 according to the state of the art, in the region of the largest diameter measures approx. 75 mm and the mask body connecting thereto widens up to its end, to a diameter of 85 to 90 mm, at a height of 40 to 45 mm. With the previously described embodiment according to the invention, the carrier 12 can have a width for example of 30 mm and a length of approx. 100 mm, and this length is composed of the length of the central plate section 14 of approx. 30 mm and the length of the first plate section 15 and of the second plate section 16 of about 35 mm together. Thus a significantly lower packing measure than with the state of the art results, even with an equally high mask body 6'.

LIST OF REFERENCE NUMERALS 1 oxygen mask
2 valve plate
3 inhalation valve
4 exhalation valve
5 breathing bag connection
6 mask body in FIG. 2
6' mask body in FIG. 6
7 lower side of the valve plate
8 inner space
9 flexible tube
10 flow display
11 breathing bag
12 carrier
13 carrier plate
14 central plate section
15 first plate section
16 second plate section
17, 17' first and second film hinge
18 rubber band
19 first end of rubber band
20 second end of rubber band

The invention claimed is:

1. An oxygen mask for the emergency oxygen supply of passengers in an aircraft, comprising:
   a carrier, comprising:
      a central plate section on which a breathing bag connection for a breathing bag is provided, the central plate section defining a first hinge and a second hinge, the breathing bag connection spaced from the first hinge and the second hinge, the first hinge and the second hinge each formed as a film hinge;
      a first plate section extending laterally from the central plate section and connected to the central plate section by the first hinge, the first plate section configured to pivot along the first hinge, the first hinge thinner than the first plate section and the central plate section, wherein an inhalation valve is provided on the first plate section; and
      a second plate section extending laterally from the central plate section and connected to the central plate section by the second hinge, the second plate section configured to pivot along the second hinge, the second hinge thinner than the second plate section and the central plate section, wherein an exhalation valve is provided on the second plate section.

2. An oxygen mask according to claim 1, wherein the carrier has an essentially elongate shape and the breathing bag connection is arranged between the inhalation valve and the exhalation valve.

3. An oxygen mask according to claim 1, wherein the oxygen mask comprises an elastic band for fixing the oxygen mask on the head of a user, wherein a first end of the elastic band engages on the first plate section and a second end of the elastic band engages on the second plate section.

4. An oxygen mask according to claim 1, wherein a peripheral mask body is injected on the carrier plate.

5. An oxygen mask according to claim 4, wherein the peripheral mask body in a in a region which is adjacent the second hinge has a lower wall thickness than in regions lying there between.

6. An oxygen mask, comprising:
   a central plate section including a first hinge, a second hinge, and a breathing bag connection spaced from the first hinge and the second hinge, the first hinge and the second hinge each formed as a film hinge;
   a first plate section connected to the central plate section by the first hinge, the first hinge thinner than the first plate section and the central plate section, the first plate section including an inhalation valve; and
   a second plate section connected to the central plate section by the second hinge, the second hinge thinner than the second plate section and the central plate section, the second plate section including an exhalation valve.

7. The oxygen mask of claim 6, comprising:
   the breathing bag connection is between the inhalation valve and the exhalation valve.

8. An oxygen mask, comprising:
   a plate including:
      a central plate section including a first hinge, a second hinge, and a breathing bag connection spaced from the first hinge and the second hinge, the first hinge and the second hinge each formed as a film hinge;
      a first plate section connected to the central plate section by the first hinge, the first hinge thinner than the first plate section and the central plate section, an inhalation valve provided on the first plate section; and
      a second plate section connected to the central plate section by the second hinge, the second hinge thinner than the second plate section and the central plate section, an exhalation valve provided on the second plate section.

9. The oxygen mask of claim 8, comprising:
   the breathing bag connection is between the inhalation valve and the exhalation valve.

10. The oxygen mask of claim 8, comprising:
   a peripheral mask body injected on a side of the plate, the mask body made of silicone, the mask body has a lower wall thickness in a first region adjacent to the first hinge and a second region adjacent to the second hinge than a third region between the first region and the second region.

\* \* \* \* \*